United States Patent
Zhang

(10) Patent No.: US 8,955,266 B2
(45) Date of Patent: Feb. 17, 2015

(54) LOCKING APPARATUS

(71) Applicants: Hong Fu Jin Precision Industry (ShenZhen) Co., Ltd., Shenzhen (CN); Hon Hai Precision Industry Co., Ltd., New Taipei (TW)

(72) Inventor: Bao-Ren Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/690,307

(22) Filed: Nov. 30, 2012

(65) Prior Publication Data

US 2014/0093307 A1    Apr. 3, 2014

(30) Foreign Application Priority Data

Sep. 28, 2012    (CN) .......................... 2012 1 03665879

(51) Int. Cl.
*E04D 13/18*    (2014.01)
*F16B 9/02*    (2006.01)

(52) U.S. Cl.
CPC ..................................... *F16B 9/023* (2013.01)
USPC ............................ 52/173.3; 403/188; 403/256

(58) Field of Classification Search
USPC .......... 403/187, 188, 240, 256–261; 52/173.3
See application file for complete search history.

(56) References Cited

U.S. PATENT DOCUMENTS

| | | | | |
|---|---|---|---|---|
| 6,360,491 | B1 * | 3/2002 | Ullman | 52/22 |
| 7,780,472 | B2 * | 8/2010 | Lenox | 439/567 |
| 7,987,641 | B2 * | 8/2011 | Cinnamon | 52/173.3 |
| 8,176,693 | B2 * | 5/2012 | Abbott et al. | 52/173.3 |
| 8,627,617 | B2 * | 1/2014 | Haddock et al. | 52/173.3 |
| 8,839,573 | B2 * | 9/2014 | Cusson et al. | 52/173.3 |
| 2010/0276558 | A1 * | 11/2010 | Faust et al. | 248/222.14 |
| 2011/0214366 | A1 * | 9/2011 | Haddock et al. | 52/173.3 |
| 2011/0214367 | A1 * | 9/2011 | Haddock et al. | 52/173.3 |
| 2011/0214368 | A1 * | 9/2011 | Haddock et al. | 52/173.3 |

* cited by examiner

*Primary Examiner* — Michael P Ferguson
*Assistant Examiner* — Jonathan Masinick
(74) *Attorney, Agent, or Firm* — Novak Druce Connolly Bove + Quigg LLP

(57) ABSTRACT

A locking apparatus for mounting a photovoltaic module on a rack, the locking apparatus includes a pressing member, a blot having a head and a threaded portion, and a mounting member fixed to the rack. The pressing member includes a bottom portion, two side portions extending up from opposite sides of the bottom portion, and two pressing pieces extending outward from tops of the side portions respectively. A through hole is defined in a center of the bottom portion. Two ribs extend inward from inner surfaces of side portions respectively. A distance between the ribs is less than a diameter of the head. The head is retained in the pressing member between the ribs and the bottom portion. The threaded portion extends through the through hole to be screwed into the mounting member.

10 Claims, 11 Drawing Sheets

LOCKING APPARATUS

BACKGROUND

1. Technical Field

The present disclosure relates to locking apparatuses, and particularly, to a locking apparatus for mounting photovoltaic modules.

2. Description of Related Art

Photovoltaic modules are mounted to a bracket through locking apparatuses. A locking apparatus includes a plurality of hexagonal nuts received in a slot of the bracket beforehand, and it is often inconvenient to assemble the hexagonal nuts to the locking apparatus because the hexagonal nuts cannot be guided to be correctly and automatically positioned.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
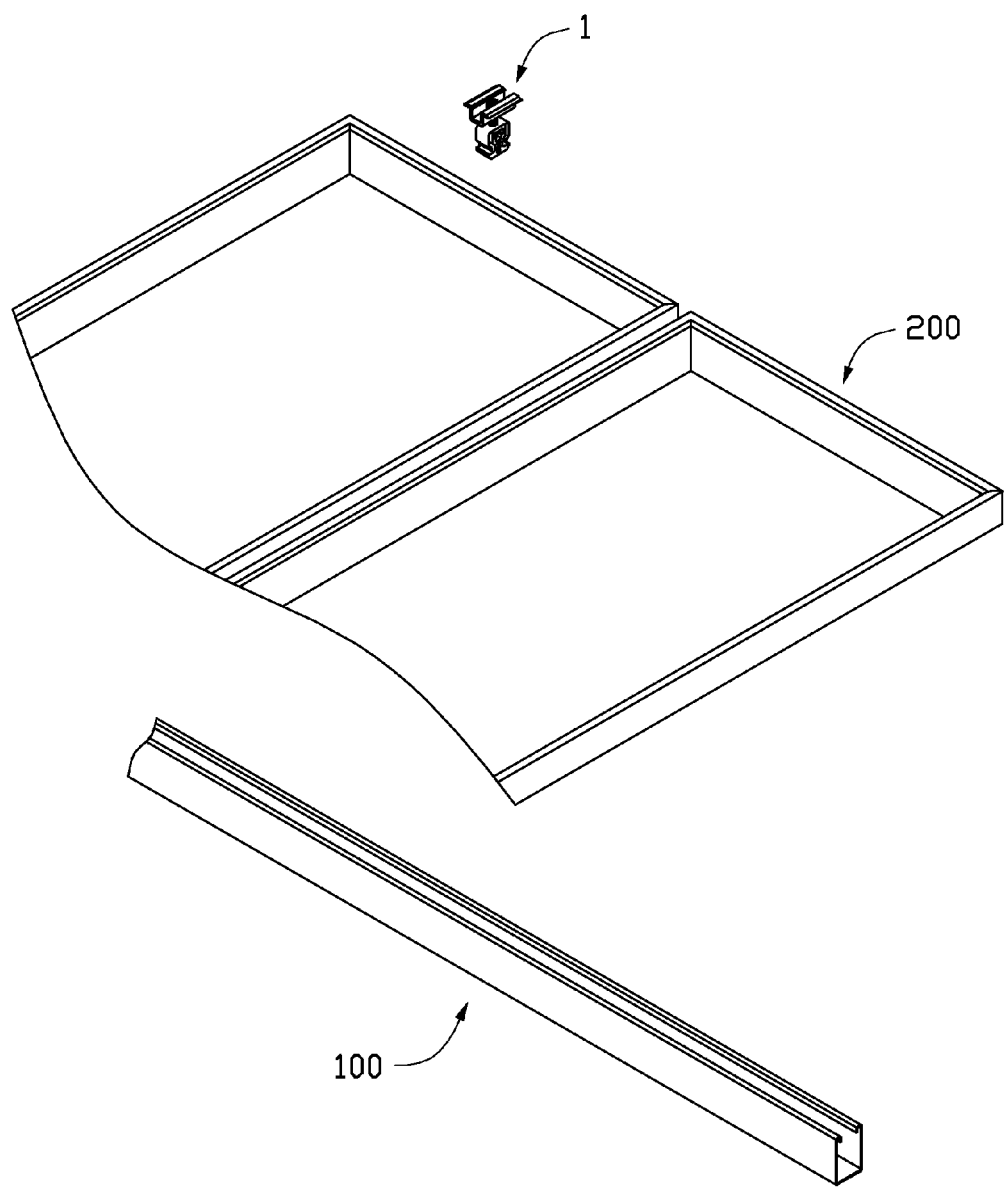
FIG. 1 is an exploded, isometric view of an embodiment of a locking apparatus, together with a rack and two photovoltaic modules.
Figure 2:
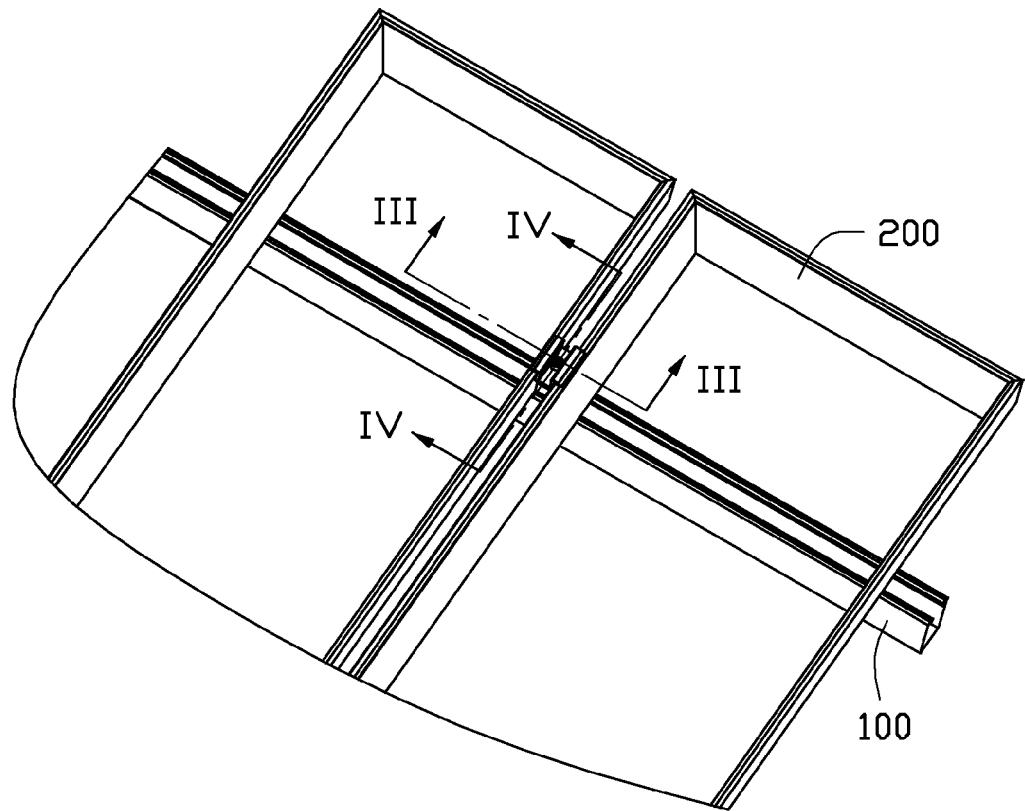
FIG. 2 is an assembled, isometric view of FIG. 1.

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Referring to FIG. 1 to FIG. 4, an embodiment of a locking apparatus 1 for mounting two photovoltaic modules 200 to a rack 100 is shown. The rack 100 includes a bottom wall 101, two sidewalls 102 extending up from opposite sides of the bottom wall 101, and two L-shaped limiting plates 103 first extending inward and then down respectively from tops of the sidewalls 102. An opening 104 is defined between the limiting plates 103.

Figure 5:
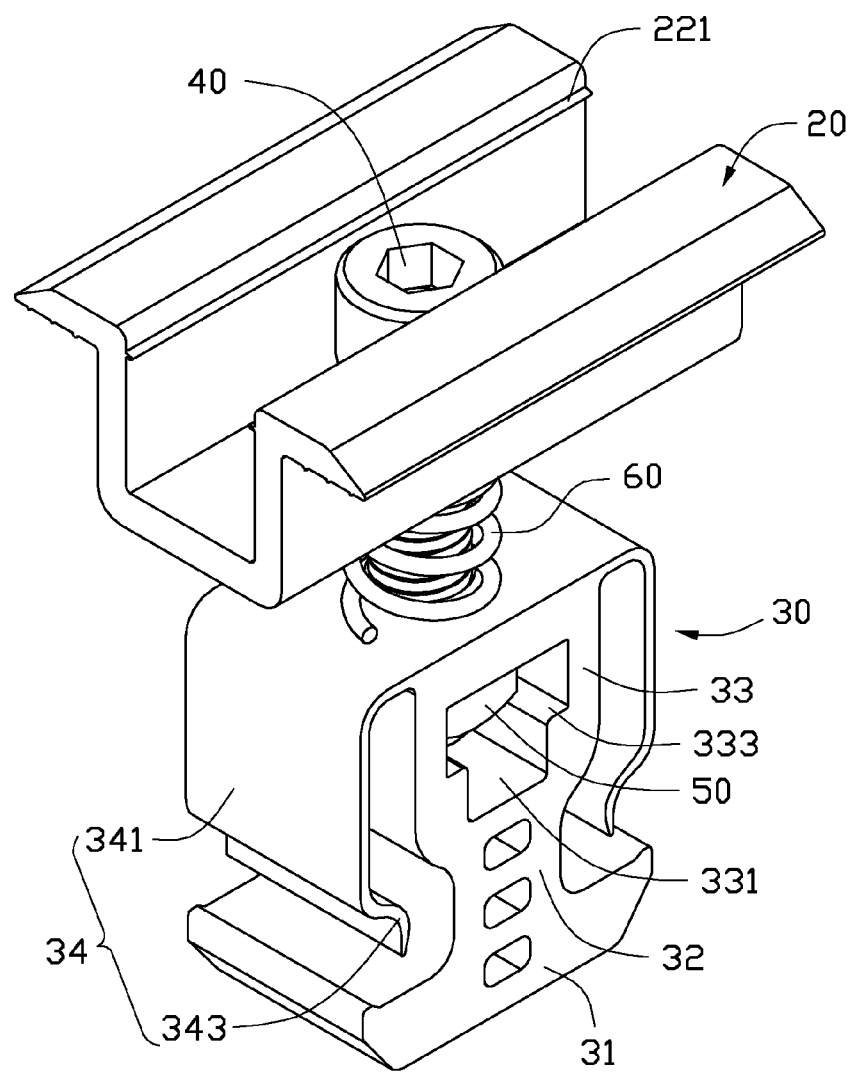
FIG. 5 is an enlarged view of the locking apparatus of FIG. 1.
Figure 6:
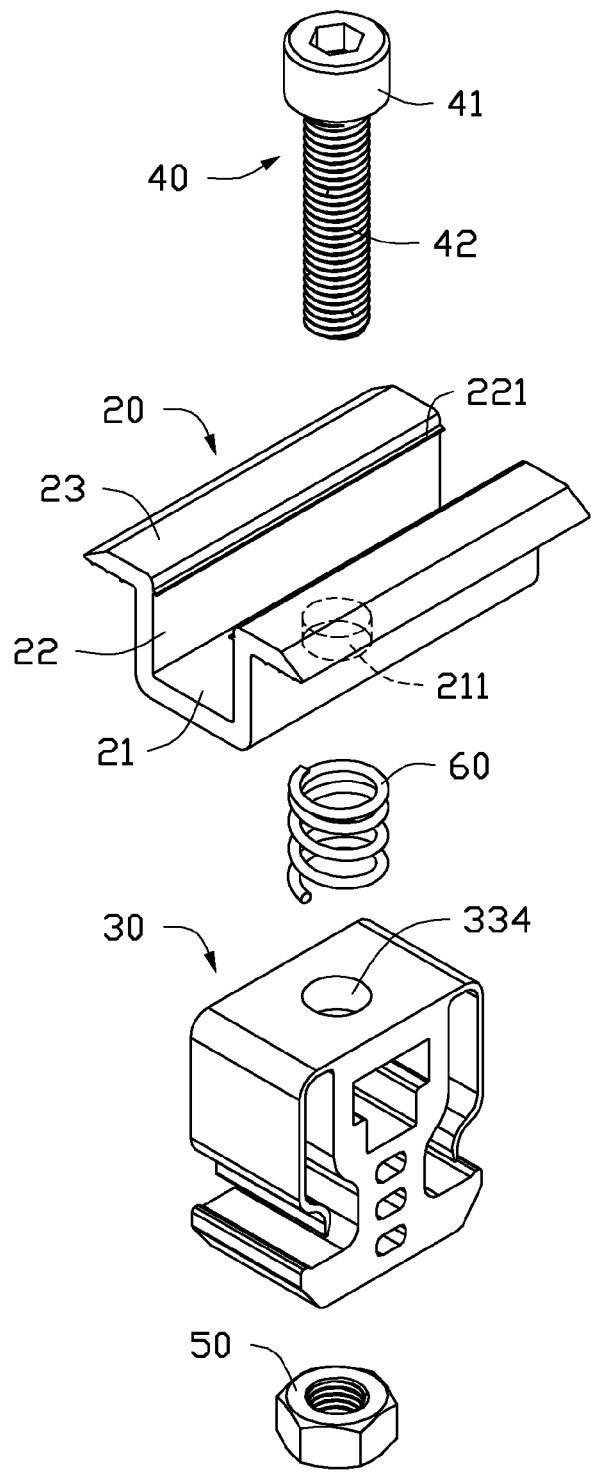
FIG. 6 is an exploded view of the locking apparatus of FIG. 5, wherein the locking apparatus includes a pressing member.

Referring to FIG. 5 and FIG. 6, the locking apparatus 1 includes a pressing member 20, a mounting member 30, a bolt 40, a nut 50, and a resilient member 60. In this embodiment, the resilient member 60 is a coil spring.

Figure 7:
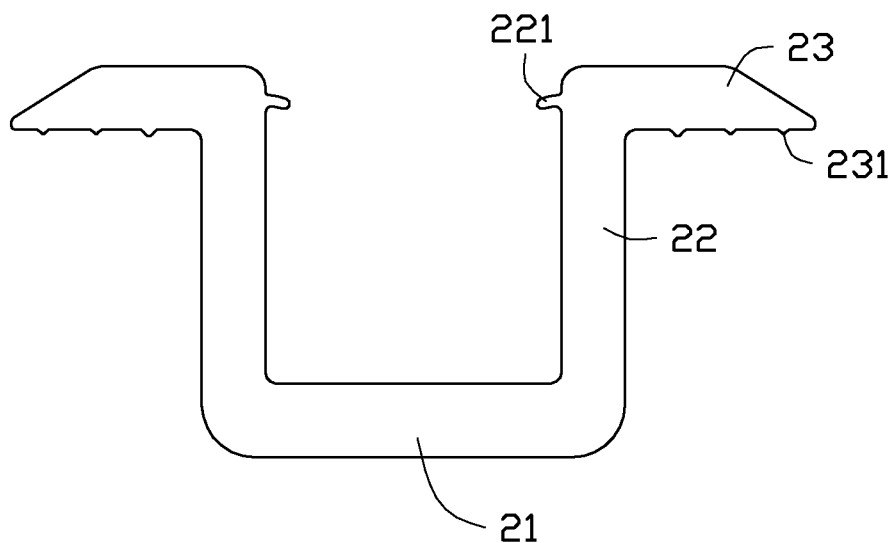
FIG. 7 is a side plan view of a first embodiment of the pressing member of FIG. 6.

Referring to FIG. 7, the pressing member 20 includes a bottom portion 21 and two side portions 22 extending up from opposite sides of the bottom portion 21. A pressing piece 23 extends outward from a top of each side portion 22, away from the other side portion 22. A through hole 211 is defined in a center of the bottom portion 21. An elongated rib 221 extends inward from an inner surface of each side portion 22. A plurality of anti-slip portions 231 are formed from a bottom of each pressing piece 23.

The mounting member 30 includes a rectangular base 31, a neck portion 32 extending up from a middle of the base 31, a head portion 33 extending up from a top of the neck portion 32, and two resilient arms 34 respectively extending outward and down from opposite sides of a top of the head portion 33. A T-shaped through slot 331 is defined in the head portion 33 in fore-and-aft direction. Two stepped portions 333 are formed at opposite sidewalls in the through slot 331. A through hole 334 is defined in the top of the head portion 33 and communicates with the through slot 331. Each resilient arm 34 includes a main plate 341, parallel to the left and right sidewalls of the head portion 33, and an L-shaped engaging portion 343, extending inward and down from a lower portion of the main plate 341. The width of the base 31 in the fore-and-aft direction is less than the width of the opening 104. Therefore, the mounting member 30 can be laterally put in the rack 100 through the opening 104.

The bolt 40 includes a head 41 and a threaded portion 42.

In assembly, the mounting member 30 is laterally put into the opening 104 until the base 31 is received in the rack 100. The mounting member 30 is then rotated 90 degrees to make the top of the base 31 abut bottoms of the limiting plates 103. The engaging portions 343 resiliently abut upper portions of inner surfaces of the limiting plates 103. Thus, the neck portion 32 is located in the opening 104. The nut 50 is inserted in the through slot 331 and supported on the stepped portions 333.

The threaded portion 42 extends through the through hole 211, the resilient member 60, and the through hole 334 in that order, to be screwed into the nut 50. The diameter of the head 41 is less than the space between the side portions 22 and greater than the space between the ribs 221. Thus, after the head 41 is inserted in between the side portions 22, by deforming the ribs 221 to pass through the ribs 221, the head 41 is located between the bottom portion 21 and the ribs 221, to make the head 41 retain in the pressing member 20.

Figure 3:
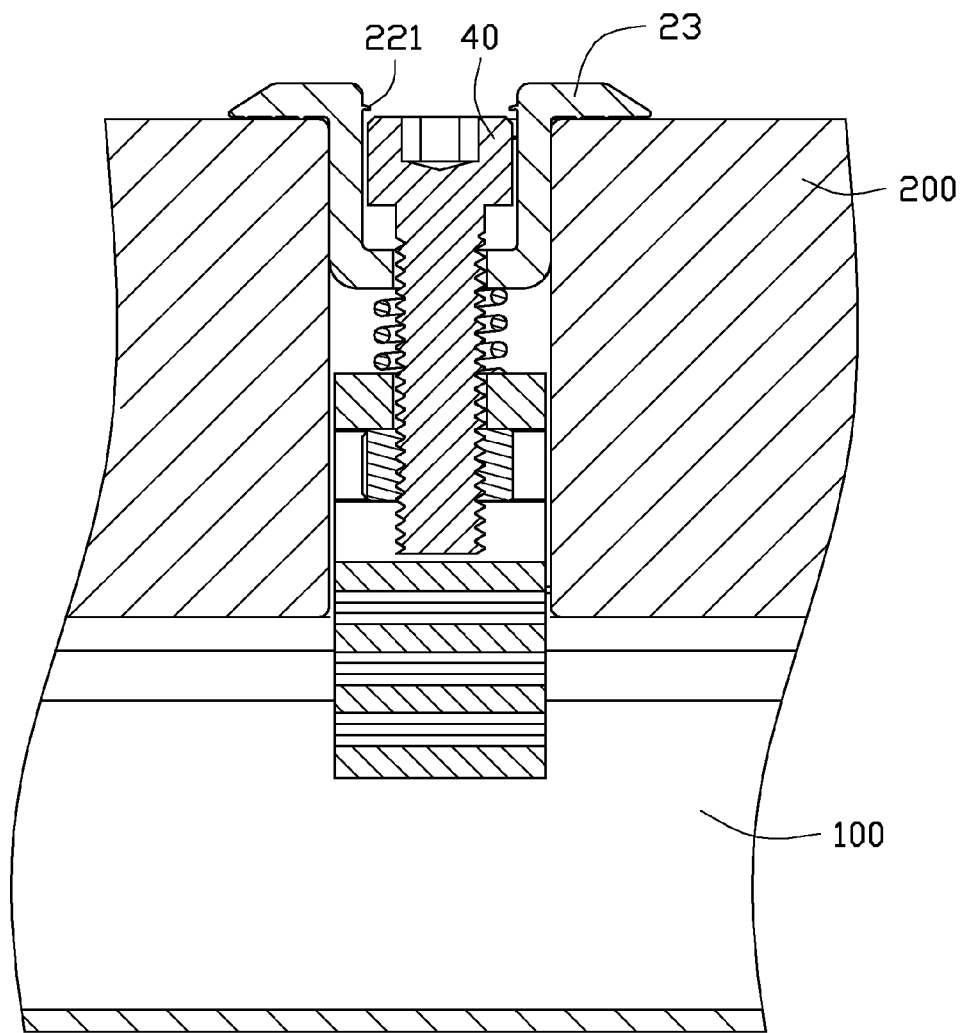
FIG. 3 is a cross-sectional view of FIG. 2, taken along the line of III-III.
Figure 4:
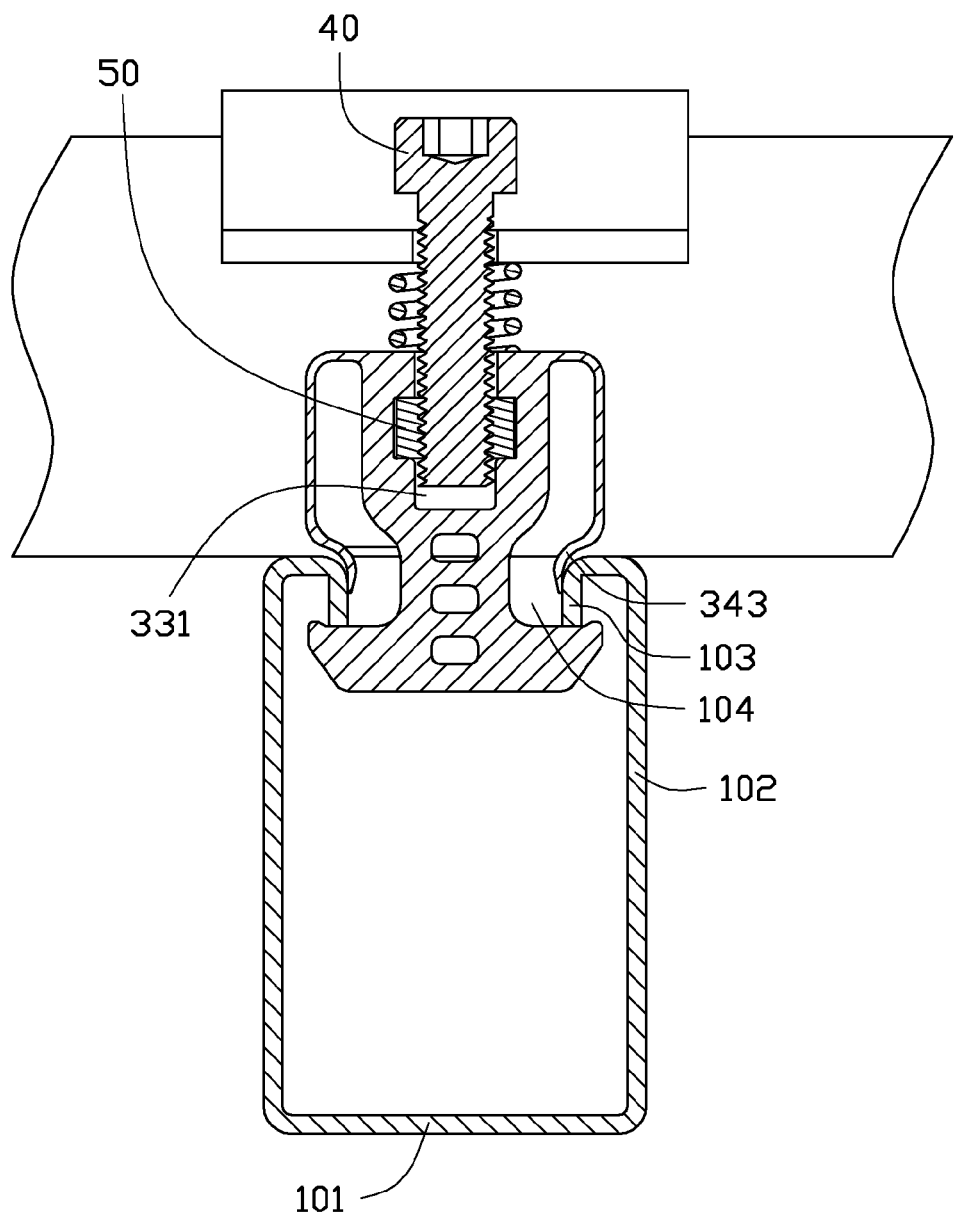
FIG. 4 is a cross-sectional view of FIG. 2, taken along the line of IV-IV.

Referring to FIG. 3, the bolt 40 is rotated to be further screwed in the nut 50, to make the sides of the photovoltaic modules 200 firmly sandwiched between the pressing piece 23 and the rack 100. The length of the base 31 is greater than the width of the opening 104, thus can prevent the base 31 from releasing from the rack 100. Before assembling the photovoltaic modules 200, the pressing member 20 is attached to the head 41 and located away from the rack 100, which is convenient to insert the photovoltaic modules 200 below the pressing pieces 23.

Figure 8:
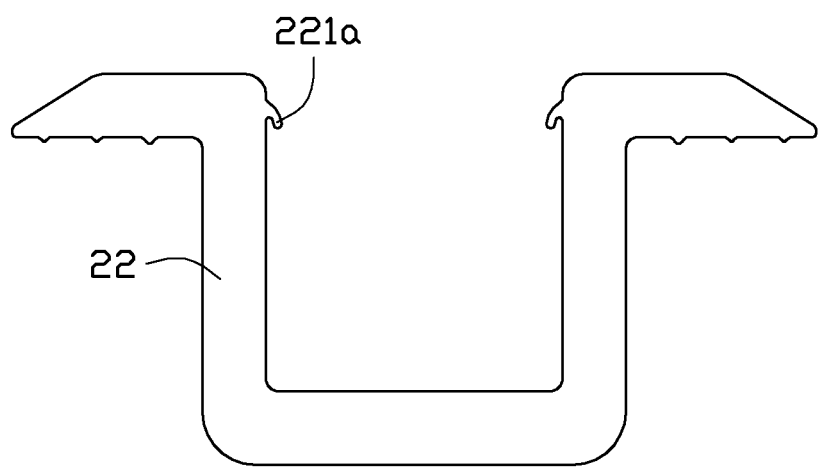
FIG. 8 is a side plane view of a second embodiment of the pressing member of FIG. 6.
Figure 9:
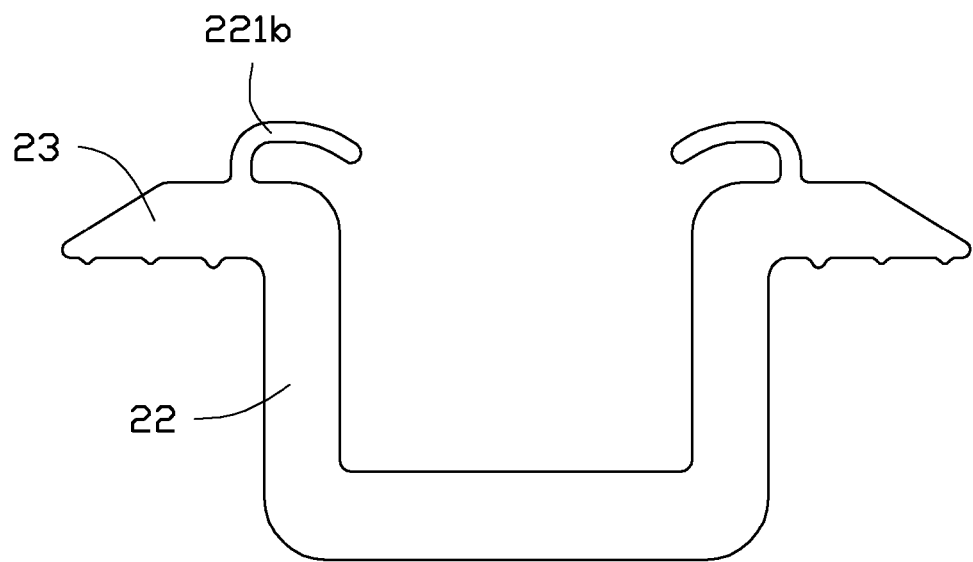
FIG. 9 is a side plane view of a third embodiment of the pressing member of FIG. 6.
Figure 10:
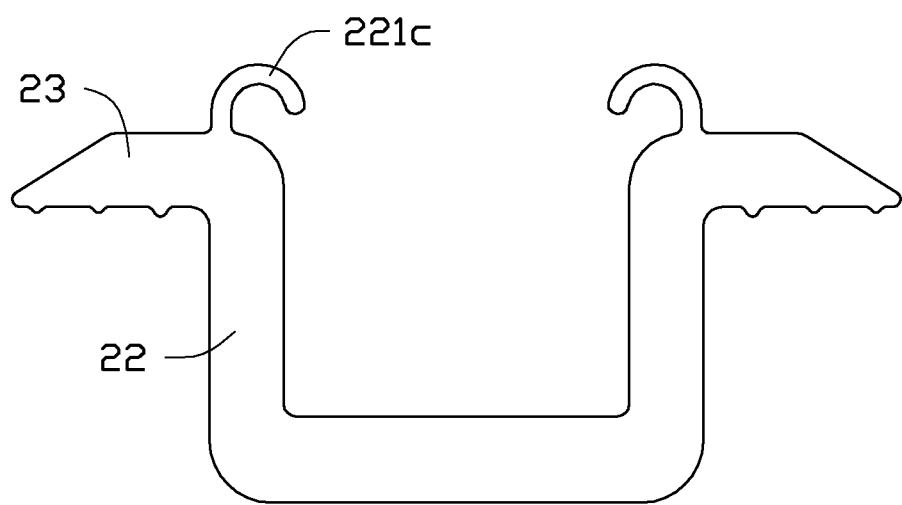
FIG. 10 is a side plane view of a fourth embodiment of the pressing member of FIG. 6.
Figure 11:
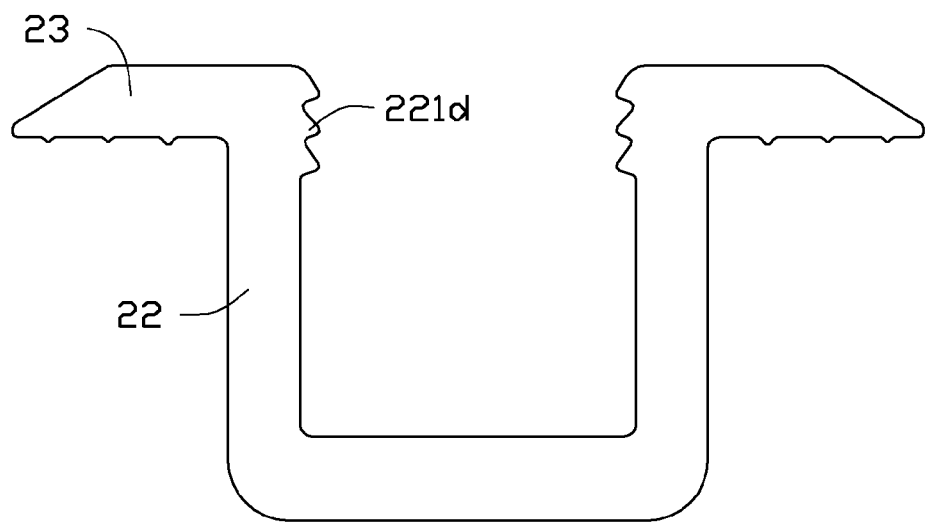
FIG. 11 is a side plane view of a fifth embodiment of the pressing member of FIG. 6.

Referring to FIG. 8 to FIG. 11, the pressing member 20 having altered ribs 221 are shown. Two ribs 221a shown in FIG. 8 are arc-shaped and extend down from the inner surfaces of the side portions 22, respectively. Two ribs 221b shown in FIG. 9 extend up and inward from top surfaces of the pressing pieces 23, respectively. The distance between the ribs 221b is less than the diameter of the head 41. Two ribs 221c shown in FIG. 10 are arc-shaped and extend up and inward from top surfaces of the pressing pieces 23, respectively. The distance between the ribs 221c is less than the diameter of the head 41. Two ribs 221d shown in FIG. 11 are tooth-like and extend down slantingly from inner surfaces of the side portions 22, respectively.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A locking apparatus for mounting a photovoltaic module on a rack, the locking apparatus comprising:
   a pressing member comprising a bottom portion and two side portions extending up from opposite sides of the bottom portion, wherein two pressing pieces extend outward from tops of the two side portions respectively, a first through hole is defined in a center of the bottom portion, two ribs extend inward from the two side portions respectively;
   a bolt comprising a head and a threaded portion; and
   a mounting member fixed to the rack;
   wherein a distance between the two ribs is less than a diameter of the head, the head is retained in the pressing member between the two ribs and the bottom portion, the threaded portion extends through the first through hole to be screwed into the mounting member;
   wherein the mounting member comprises a base, a neck portion extending up from a middle of the base, a head portion extending up from a top of the neck portion, and two resilient arms respectively extending outward from opposite sides of the head portion; and a through slot is defined in the head portion, a second through hole is defined in a to of the head portion and communicates with the through slot, a nut is received in the second through hole, and the threaded portion extends through the second through hole to be screwed into the nut;
   wherein the rack comprises a bottom wall, two sidewalls extending up from opposite sides of the bottom wall, and two substantially L-shaped limiting plates extending inward and down respectively from tops of the two sidewalls; and an opening is defined between the L-shaped limiting plates, the neck portion of the mounting member is received in the opening, a top of the base abuts bottoms of the L-shaped limiting plates, and the resilient arms abut upper portions of inner surfaces of the L-shaped limiting plates.

2. The locking apparatus of claim 1, wherein a plurality of anti-slip portions is formed on a bottom of each of the two pressing pieces.

3. The locking apparatus of claim 1, wherein a resilient member is set around the threaded portion and located between the bottom portion of the pressing member and the mounting member.

4. The locking apparatus of claim 1, wherein two stepped portions are formed at opposite sidewalls in the through slot, and the nut is supported on the two stepped portions.

5. The locking apparatus of claim 1, wherein each resilient arm comprises a main plate parallel to left and right sidewalls of the head portion and an engaging portion extending inward and down from a lower portion of the main plate.

6. The locking apparatus of claim 5, wherein a width of the base is less than a width of the opening, and a length of the base is greater than the width of the opening.

7. The locking apparatus of claim 1, wherein the ribs are arc-shaped and extend down from inner surfaces of the side portions.

8. The locking apparatus of claim 1, wherein the ribs extend up and inward from top surfaces of the two pressing pieces respectively.

9. The locking apparatus of claim 1, wherein the ribs are arc-shaped and extend up and inward from top surfaces of the two pressing pieces respectively.

10. The locking apparatus of claim 1, wherein the two ribs are tooth-like and extend down slantingly from inner surfaces of the two side portions respectively.

* * * * *